United States Patent [19]

Li

[11] Patent Number: 5,134,732

[45] Date of Patent: Aug. 4, 1992

[54] FRAME STRUCTURE FOR A BABY'S CRIB

[76] Inventor: Hsing Li, No. 17, Yung Hsing Street, Taichung, Taiwan

[21] Appl. No.: 804,402

[22] Filed: Dec. 10, 1991

[51] Int. Cl.⁵ .............................................. A47D 7/00
[52] U.S. Cl. ......................................... 5/93.1; 5/286; 5/282.1; 5/285; 403/403; 403/382; 403/407.1
[58] Field of Search ................. 5/93.1, 99.1, 102, 201, 5/282.1, 285, 286, 93.2; 403/403, 382, 407.1

[56] References Cited

U.S. PATENT DOCUMENTS

| | | | |
|---|---|---|---|
| 2,348,012 | 5/1944 | Levi | 5/99.1 |
| 3,427,669 | 2/1969 | Swenson | 5/93.1 |

FOREIGN PATENT DOCUMENTS

| | | | |
|---|---|---|---|
| 82328 | 11/1956 | Denmark | 5/93.1 |
| 1138138 | 6/1957 | France | 5/93.1 |
| 2537416 | 6/1984 | France | 5/99.1 |

Primary Examiner—Alexander Grosz
Attorney, Agent, or Firm—Bacon & Thomas

[57] ABSTRACT

A frame structure for a baby's crib, comprising a plurality of channels bars at the four sides thereof at the bottom as well as at the top, a plurality of mounting bars around the four sides thereof at the bottom as well as at the top and respectively fastened inside said channel bars, a plurality of locking caps and connectors at the four corners for securing said channel bars and said mounting bars in position, and a plurality of balusters vertically disposed around the four sides thereof and retained between those mounting bars at the top and those mounting bars at the bottom. The mounting bars each have a plurality of egg-shaped blind holes and a plurality of egg-shaped notched holes made thereon at the top and alternatively arranged in a line into which the balusters are fastened and prohibited from rotary motion.

1 Claim, 3 Drawing Sheets

FRAME STRUCTURE FOR A BABY'S CRIB

BACKGROUND OF THE INVENTION

1. Field of the Invention

The present invention relates to baby's cribs and relates more particularly to a frame structure for a baby's crib which is easy to assemble, durable in use, and inexpensive to manufacture.

2. Description of the Prior Art

The frame structure for a baby's crib as constructed according to the prior art may be made from wooden, aluminum or metal material. According to conventional manufacturing process, aluminum or wooden bars must be respectively drilled with holes so that they can be connected into shape by fastening means. In case any hole is not accurately made, the frame structure after assembly may become unstable. If the frame structure for a baby's crib is made from metal material, complicated point welding process is required. Further, the manufacturing cost for a baby's crib according to the prior at is generally expensive.

SUMMARY OF THE INVENTION

The present invention has been accomplished to eliminate the aforesaid disadvantages. It is therefore an object of the present invention to provide a frame structure for a baby's crib which is easy to assemble, durable in use and inexpensive to manufacture.

According to one aspect of the present invention, a frame structure for a baby's crib is generally comprised of a rectangular frame assembly supported on wheels at four corners, which rectangular frame assembly is comprised of a first rectangular frame at the top, a second assembly frame at the bottom supported on said wheels, and a plurality of balusters vertically disposed around the periphery thereof and connected between said first rectangular frame and said second rectangular frame, wherein said first and second rectangular frames each comprised of four U-shaped channel bars at four sides respectively connected by means of locking caps and connectors, and a plurality of mounting bars respectively fastened inside said U-shaped channel bars.

According to another aspect of the present invention, the U-shaped channel bars, the mounting bars and the balusters are respectively made from plastic material through the process of injection molding. Because the parts are standardized, the manufacturing process of the present invention is simplified.

According to still another aspect of the present invention, the mounting bars each has a plurality of egg-shaped blind holes and a plurality of egg-shaped notched holes made thereon at the top and alternatively arranged in a line into which the balusters are fastened and prohibited from rotary motion.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Referring to the annexed drawings in detail, a baby's crib as constructed in accordance with the present invention is generally comprised of a rectangular frame assembly supported on wheels at four corners, which rectangular frame assembly is comprised of a plurality of U-shaped channel bars 2 around the four sides thereof at the bottom as well as at the top, a plurality of mounting bars 1 around the four sides thereof at the bottom as well as at the top and respectively fastened inside said channel bars 2, and a plurality of balusters 5 vertically disposed around the four sides thereof and retained between those mounting bars 1 at the top and those mounting bars 1 at the bottom. The U-shaped channel bars 2, the mounting bars 1 and the balusters 5 may be made from plastic material through the process of injection molding.

Figure 1:
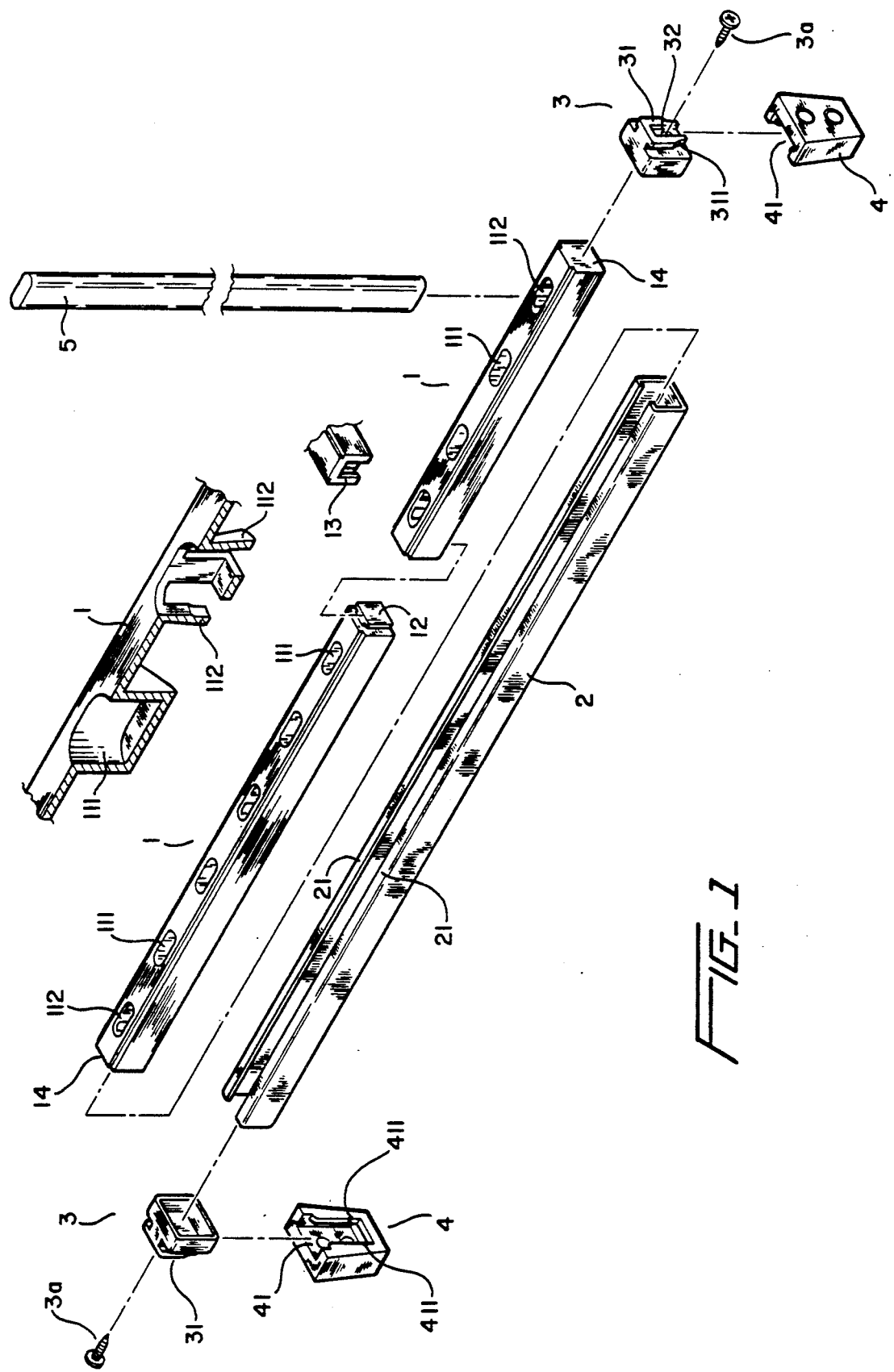
FIG. 1 is an exploded perspective view of the present invention.
Figure 2:
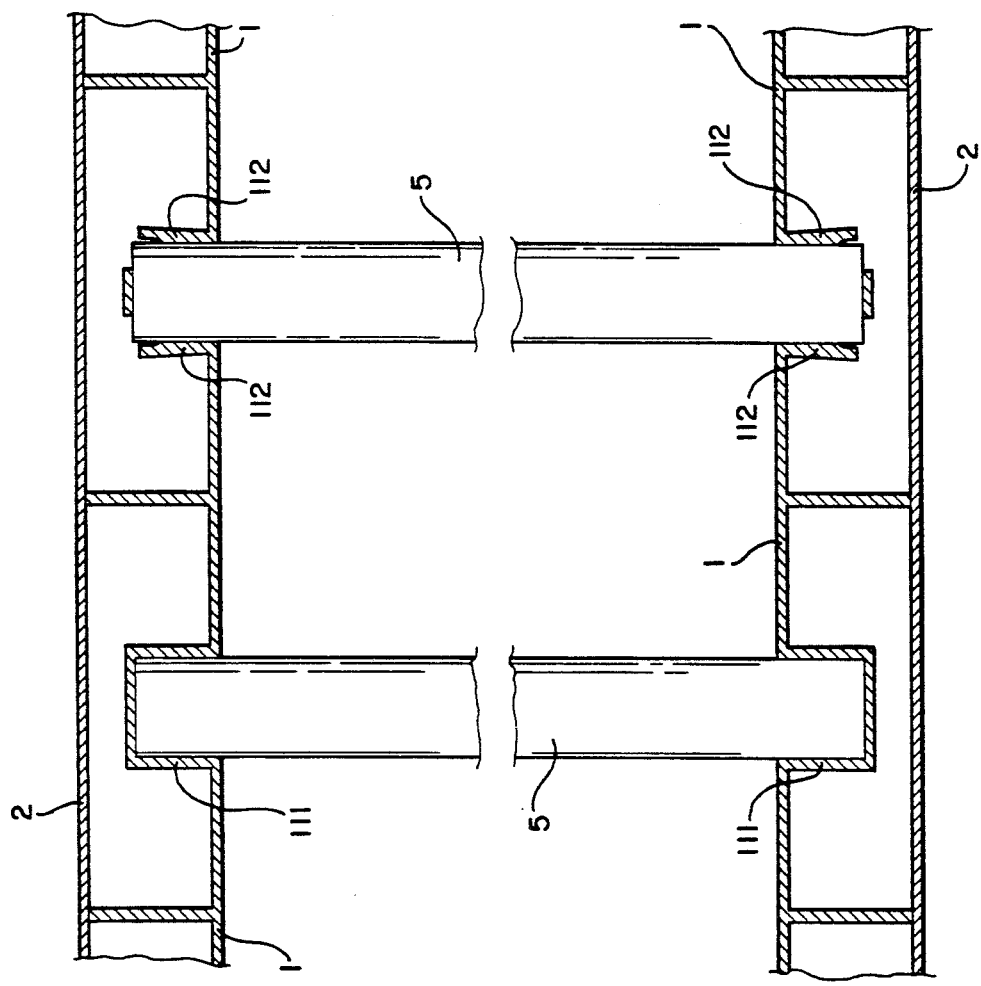
FIG. 2 is a sectional assembly view thereof.

As illustrated in FIG. 1, each mounting bar 1 which has a substantially rectangular-shaped cross section and has a plurality of oval holes 11 equidistantly made on the top edge thereof, which oval holes 11 include a plurality of blind holes 111 and a plurality of notched holes 112 alternatively aligned in a row, a tongue 12 or groove 13 at one end, and a flat edge 14 at an opposite end. Further, each U-shaped channel bar 2 has two opposed, inward flanges 21 at the top. The two opposite ends of each U-shaped channel bar 2 is attached with two locking caps 3. Each locking cap 3 comprises a T-shaped retaining groove 31 at one side, two raised portions 311 bilaterally disposed at the bottom, and a through-hole 32 at the center through which a screw 3A can be fastened to secure the locking cap 3 to the flat edge 14 at one end on either mounting bar 1. By attaching a connector 4 to a locking cap 3 at one end of an U-shaped channel bar 2 and a mounting bar 1, another U-shaped channel bar 2' can be secured thereto at right angle. The connector 4 comprises a T-shaped retaining groove 41 at one side, and two opposite notches 411 on said retaining groove 41 at the bottom.

Figure 3:
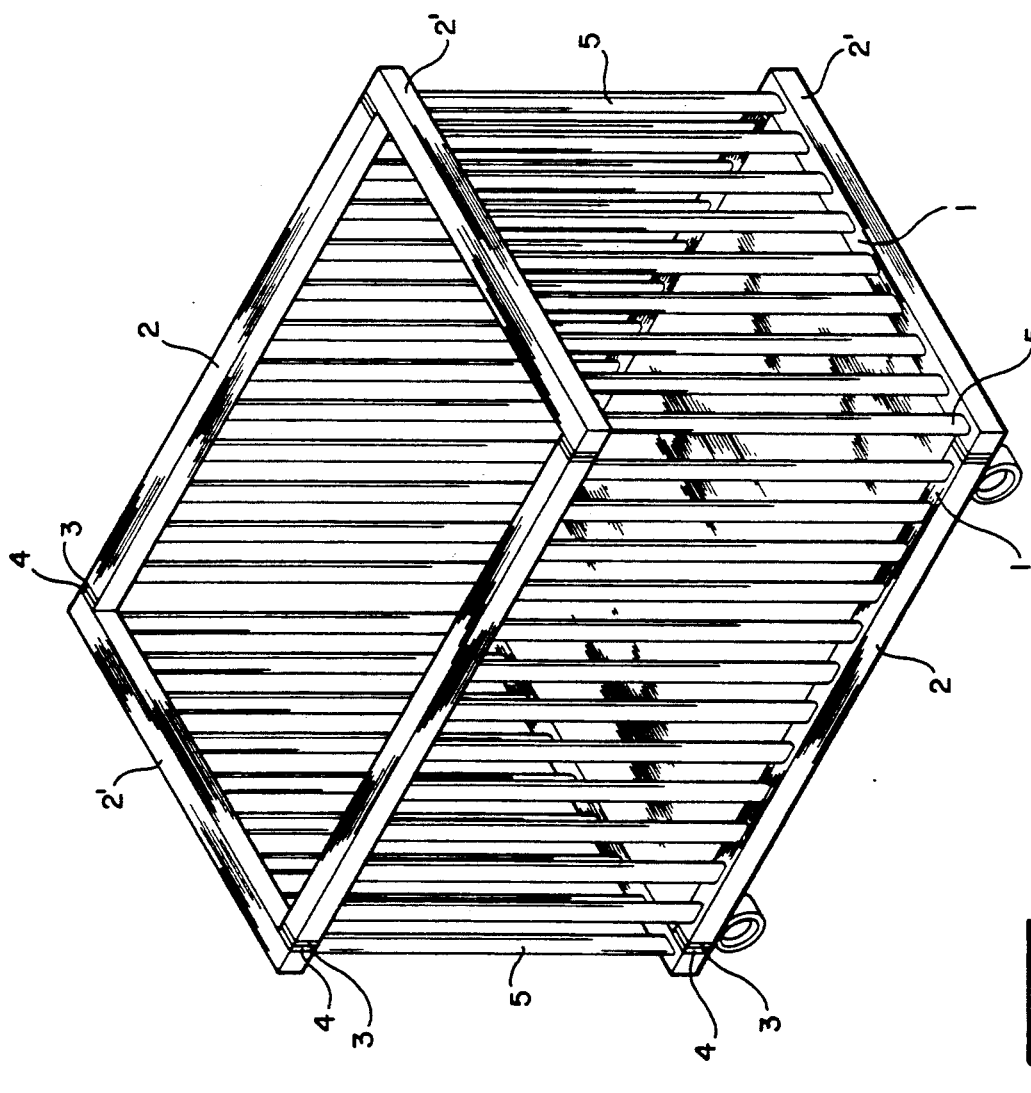
FIG. 3 is an elevational view of a baby's crib as constructed according to the present invention.

Assembly process of the present invention is easy to complete. By means of connecting the tongue 12 on one mounting bar with the groove 13 on another, a plurality of mounting bars 1 are connected in series and inserted in a first U-shaped channel bar 2. Then, two locking caps 3 are respectively secured to the two opposite ends of the U-shaped channel bar 2 by screws 3A to firmly retain the mounting bars 1 in place. A connector 4 is attached to a second U-shaped channel bar 2' which has mounting bars 1 fastened therein, and then, the connector 4 is secured to the locking cap 3 at one end by means of engaging the T-shaped retaining groove 31 and the raised portions 311 of the locking cap 3 in the T-shaped groove 41 and the two opposite notches 411 of the connector so as to secure the second U-shaped channel bar 2' to the first U-shaped channel bar 2 at right angle. By means of the aforesaid procedure, two rectangular frames are set up and then connected by balusters 5. The balusters 5 are respectively fastened in the blind holes 111 and the notched holes 112 on the mounting bars 1 of the rectangular frame at the bottom and the blind holes 111 and the notched holes 112 on the mounting bars of the rectangular frame at the top. Thus, a frame assembly for a baby's crib is set up. Once wheels are respectively attached to the frame structure at the four corners thereof at the bottom, a baby's crib is formed as shown in FIG. 3.

In the present invention, the notched holes 112 and the blind holes 111 are alternatively arranged for mounting the balusters 5, the frame assembly is reinforced after assembly. Because the notched holes 112 and the blind holes 111 are respectively made in an oval shape which prohibits a baluster 5 from rotary motion. Further, the U-shaped channel bars 2 are respectively made from a rigid plastic material which is strong enough to support a heavy load.

I claim:

1. A frame structure for a baby's crib comprised of a rectangular frame assembly supported on wheels at four corners, said rectangular frame assembly being comprised of a first rectangular frame at the top, a second rectangular frame at the bottom supported on said wheels, and a plurality of balusters vertically disposed around the periphery thereof and connected between said first rectangular frame and said second rectangular frame, said first and second rectangular frames each comprised of four U-shaped channel bars at four sides respectively connected by a plurality of locking caps and connectors, and a plurality of mounting bars, and characterized in that said mounting bars each having a plurality of oval holes equidistantly formed on the top edge thereof for mounting said balusters, said oval holes including a plurality of blink holes and a plurality of notched holes alternatively aligned in a row, a tongue or groove at one end, and a flat edge at an opposite end, said locking caps each being fastened on the flat edge at one end on a mounting bar by a screw and having a T-shaped retaining groove at one side and two opposite, raised portions at the bottom at the same side; said connectors each having a T-shaped retaining groove and two opposite notches respectively engaged with the T-shaped retaining groove and the two opposite, raised portions on each locking cap.

* * * * *